3,636,075
LOWER ALKYL α-(DI-LOWER ALKYLSULFAM-
OYL)-α-PHENYLALKANOIC ACID ESTERS
Bernard Loev, Broomall, Pa., assignor to Smith Kline &
French Laboratories, Philadelphia, Pa.
No Drawing. Filed Nov. 13, 1969, Ser. No. 876,575
Int. Cl. C07c 143/78
U.S. Cl. 260—470                    3 Claims

ABSTRACT OF THE DISCLOSURE

The compounds are lower alkyl α-(di-lower alkylsulf-amoyl)-α-phenylalkanoic acid esters having antidepressant activity.

---

This invention relates to new lower alkyl α-(di-lower alkylsulfamoyl)-α-phenylalkanoic acid esters having pharmacodynamic activity in particular having antidepressant activity. The antidepressant activity is demonstrated by the prevention of reserpine ptosis in mice at doses of about 50 mg./kg. orally.

The compounds of this invention are represented by the following formula:

FORMULA I

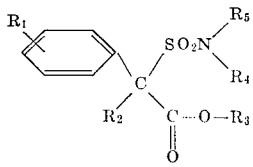

in which:

$R_1$ is hydrogen, chloro, bromo, fluoro, trifluoromethyl, lower alkyl or lower alkoxy and
$R_2$, $R_3$, $R_4$ and $R_5$ are lower alkyl.

Advantageous compounds of this invention are represented by Formula I above in which $R_1$ is hydrogen, $R_2$ is ethyl, $R_3$ is methyl or ethyl and $R_4$ and $R_5$ are methyl.

The compounds of this invention are prepared by the following procedure.

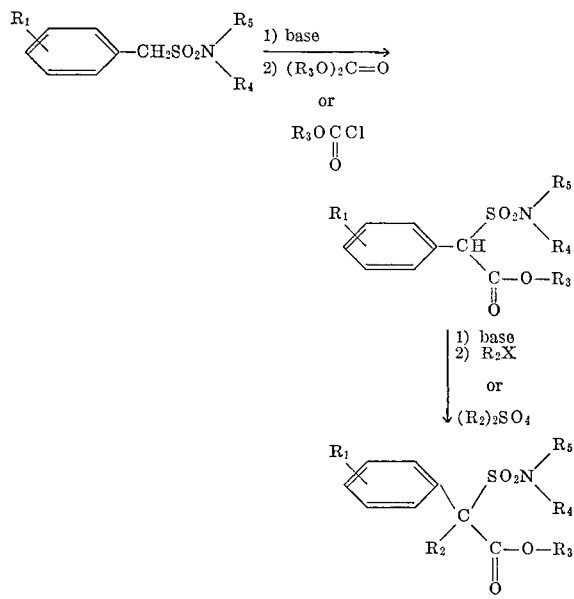

The terms $R_1$, $R_2$, $R_3$, $R_4$ and $R_5$ are as defined above and X is halo.

According to the above procedure, a N,N-di-lower alkyl-α-toluenesulfonamide is treated with a base such as potassium hydride, sodium hydride, sodium amide, potassium t-butoxide or butyl lithium to give an anion which is treated with a di-lower alkyl carbonate or a lower alkyl chloroformate to give the lower alkyl α-(di-lower alkylsulfamoyl)-α-phenylacetic acid ester. This intermediate is treated with a base such as sodium or potassium hydride, sodium amide, potassium t-butoxide or butyl lithium, then with a lower alkyl halide or sulfate to give the lower alkyl α-(di-lower alkylsulfamoyl)-α-phenylalkanoic acid ester.

The N,N-di-lower alkyl-α-toluenesulfonamide intermediates are prepared by known methods such as the following procedure:

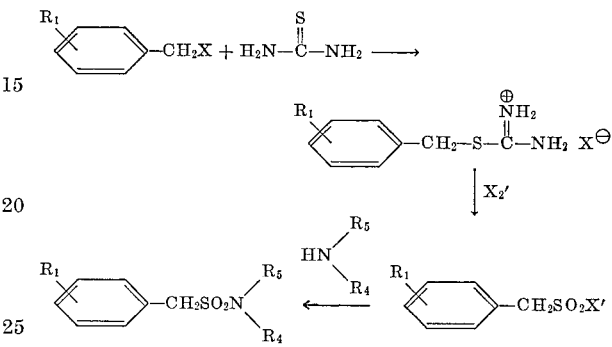

The terms $R_1$, $R_4$ and $R_5$ are as defined above, X is halo and X' is chloro or bromo.

According to the above procedure, an α-halotoluene is reacted with thiourea and the resulting thiuronium salt is chlorinated or brominated, preferably in aqueous acetic acid, to give the α-toluenesulfonyl chloride or bromide, respectively, which is reacted with a di-lower alkylamine to give the N,N-di-lower alkyl-α-toluenesulfonamide.

The compounds of this invention may be combined with pharmaceutical carriers according to accepted pharmaceutical practice and administered internally in conventional dosage forms containing appropriate doses of the compound.

The terms "lower alkyl" and "lower alkoxy" where used herein denote groups having 1–4 carbon atoms.

The following examples are not limiting but are illustrative of the compounds of this invention and processes for their preparation.

EXAMPLE 1

α-Toluenesulfonyl chloride (226.5 g.) is dissolved in 1500 ml. of ether and the ether solution is added with stirring to 1500 ml. of 25% aqueous dimethylamine solution at 10–15° C. The mixture is stirred at room temperature for 2.5 hours, then concentrated and filtered. The solid material obtained is washed with cold water, recrystallized from isopropanol-isopropyl ether (1:1) and dried at 70° C. for six hours to give N,N-dimethyl-α-toluenesulfonamide.

A 33% potassium hydride dispersion in oil (51 g.) is suspended in 300 ml. of dry tetrahydrofuran. N,N-dimethyl-α-toluenesulfonamide (83.4 g.) is dissolved in 600 ml. of dry tetrahydrofuran and the solution is added to the potassium hydride suspension dropwise, with stirring, over one hour.

The resulting solution is stirred for 30 minutes and 37.8 g. of dimethyl carbonate in 240 ml. of tetrahydrofuran is added dropwise, with stirring, over 30 minutes. The solution is stirred for 15 minutes, then refluxed with stirring for 17 hours with the addition of 30 ml. of additional tetrahydrofuran. The solvent is removed by distillation and the residue is dissolved in 500 ml. of 50% aqueous acetic acid. The solution is extracted with ether and the ether layers are combined, washed with water, then with 5% aqueous sodium bicarbonate solution and with water, dried over magnesium sulfate and concentrated to dryness. The residue is dissolved in acetonitrile and the solution is extracted with petroleum ether, then the acetonitrile solution is concentrated to dryness. The residue is distilled to give methyl α-(dimethylsulfamoyl)-α-phenylacetate.

A 33% potassium hydride dispersion in mineral oil (3.3 g.) is suspended in 20 ml. of dry tetrahydrofuran. Methyl α-(dimethylsulfamoyl)-α-phenylacetate (7.0 g.) is dissolved in 40 ml. of dry tetrahydrofuran and the solution is added to the potassium hydride suspension dropwise over 30 minutes. During the addition, an additional 40 ml. of tetrahydrofuran is added. After the addition is complete, another 20 ml. of tetrahydrofuran is added and the mixture is stirred for one hour at room temperature, then refluxed on a steam bath for 30 minutes and then chilled to 20° C. A solution of 4.24 g. of ethyl iodide in 15 ml. of tetrahydrofuran is added dropwise with stirring. The mixture is stirred at room temperature for 1.5 hours, then is heated at reflux on a steam bath overnight.

The solvent is evaporated and the residue is triturated with ethyl acetate and then filtered. The filtrate is concentrated to dryness, the residue is stirred with petroleum ether and the solid material is filtered off and recrystallized from isopropyl ether. The solid material obtained is then recrystallized from cyclohexane to give methyl α-(dimethylsulfamoyl)-α-phenylbutanoate.

EXAMPLE 2

N,N-dimethyl-α-toluenesulfonamide (50.0 g.) is dissolved in 400 ml. of dry tetrahydrofuran. To the solution 19.8 g. (194 ml. of 1.6 N hexane solution) of n-butyl lithium is added dropwise with stirring at 15–20° C. The mixture is stirred for 1.5 hours at 40–45° C., then cooled to 15–20° C. Diethyl carbonate (36.6 g.), dissolved in 70 ml. of dry tetrahydrofuran, is added dropwise with stirring over five minutes. The mixture is heated to 50–55° C. on a steam bath, then heated at reflux for about 18 hours and concentrated to dryness. The residue is stirred with isopropyl ether-ethanol. Ether is added and the mixture is washed with water. The organic layer is dried over magnesium sulfate and filtered. Petroleum ether is added to the filtrate. The mixture is filtered and the filtrate is concentrated to dryness. The residue is stirred with petroleum ether and filtered to give ethyl α-(dimethylsulfamoyl)-α-phenylacetate.

Ethyl α-(dimethylsulfamoyl)-α-phenylacetate (32 g.) is dissolved in 250 ml. of dry tetrahydrofuran. This solution is added to a mixture of 16.4 g. of a 33% mineral oil dispersion of potassium hydride in 100 ml. of tetrahydrofuran at room temperature with stirring over an eight minute period. The mixture is stirred at about 50° C. for 30 minutes, then cooled to 25–30° C. Ethyl iodide (29.6 g.) is added dropwise with stirring over a 5–8 minute period. The mixture is stirred at room temperature for about 10–15 minutes and then heated at reflux overnight. The mixture is then cooled to room temperature, 50 ml. of ethanol is added slowly and the resulting mixture is then concentrated to dryness.

The residue is stirred with a 1:1 mixture of acetonitrile and heptane. The heptane layer is extracted with acetonitrile. The acetonitrile solutions are combined and concentrated. The residue is distilled and then recrystallized from isopropyl ether-petroleum ether to give ethyl α-(dimethylsulfamoyl)-α-phenylbutanoate.

EXAMPLE 3

By the procedure of Example 1, using in place of α-toluenesulfonyl chloride the following:

p-chloro-α-toluenesulfonyl chloride
m-chloro-α-toluenesulfonyl chloride
o-chloro-α-toluenesulfonyl chloride the following products are obtained, respectively:

methyl α-(p-chlorophenyl)-α-(dimethylsulfamoyl) butanoate
methyl α-(m-chlorophenyl)-α-(dimethylsulfamoyl) butanoate
methyl α-(o-chlorophenyl)-α-(dimethylsulfamoyl) butanoate.

EXAMPLE 4 p-Bromobenzyl bromide (14.5 g.) is dissolved in 58 ml. of ethanol and to this solution is added 4.8 g. of thiourea. The resulting mixture is refluxed for one hour, then concentrated in vacuo, chilled and filtered to give S-(p-bromobenzyl)thiuronium bromide.

The above prepared thiuronium bromide salt is dissolved in 120 ml. of 50% aqueous acetic acid. The solution is cooled to 10° C. and chlorine gas is bubbled into it for 1.5 hours with stirring. Filtering gives p-bromo-α-toluenesulfonyl chloride.

Treating the above prepared p-bromo-α-toluenesulfonyl chloride with diethylamine in ether solution at room temperature with stirring, then filtering and concentrating the filtrate gives p-bromo-N,N-diethyl-α-toluenesulfonamide.

According to the procedure of Example 2, p-bromo-N,N-diethyl-α-toluenesulfonamide, dissolved in dry tetrahydrofuran, is treated with butyl lithium and the resulting anion is reacted with diethyl carbonate to give ethyl α-(p-bromophenyl)-α-(diethylsulfamoyl)acetate.

Ethyl α-(p-bromophenyl)-α-(diethylsulfamoyl)acetate is reacted with potassium t-butoxide in tetrahydrofuran and the resulting anion is treated with ethyl iodide to give ethyl α-(p-bromophenyl)-α-(diethylsulfamoyl)butanoate.

EXAMPLE 5

Reacting p-ethylbenzyl bromide with thiourea and treating the resulting thiuronium bromide salt with chlorine by the procedure of Example 4 gives p-ethyl-α-toluenesulfonyl chloride.

An ether solution of p-ethyl-α-toluenesulfonyl chloride is added to a 25% aqueous dimethylamine solution. The mixture is stirred at room temperature to give, after working up by the procedure of Example 1, p-ethyl-N,N-dimethyl-α-toluenesulfonamide.

Using p-ethyl-N,N-dimethyl - α - toluenesulfonamide in place of N,N-dimethyl-α-toluenesulfonamide in the procedure of Example 2 gives ethyl α-(dimethylsulfamoyl)-α-(p-ethylphenyl)-butanoate.

By the same procedure, using o-ethylbenzyl bromide as the starting material, the product is ethyl α-(dimethylsulfamoyl)-α-(o-ethylphenyl)butanoate.

EXAMPLE 6

Using, in place of p-bromobenzyl bromide in the procedure of Example 4, the following benzyl halide compounds:

p-trifluoromethylbenzyl bromide
o-methylbenzyl bromide
p-butylbenzyl chloride
o-butylbenzyl chloride
p-fluorobenzyl bromide
p-methoxybenzyl bromide the following toluenesulfonyl chlorides are prepared, respectively:

p-trifluoromethyl-α-toluenesulfonyl chloride
o-methyl-α-toluenesulfonyl chloride
p-butyl-α-toluenesulfonyl chloride
o-butyl-α-toluenesulfonyl chloride
p-fluoro-α-toluenesulfonyl chloride
p-methoxy-α-toluenesulfonyl chloride Using the above listed toluenesulfonyl chlorides in the procedure of Example 1, the following products are obtained, respectively:

methyl α-(dimethylsulfamoyl)-α-(p-trifluoromethylphenyl)butanoate
methyl α-(dimethylsulfamoyl)-α-(o-tolyl)butanoate
methyl α - (p-butylphenyl) - α - (dimethylsulfamoyl)-butanoate methyl α - (o - butylphenyl) - α - (dimethylsulfamoyl) butanoate methyl α - (dimethylsulfamoyl) - α - (p - fluorophenyl) butanoate methyl α - (dimethylsulfamoyl) - α - (p - methoxyphenyl) butanoate.

EXAMPLE 7 p-Butoxybenzyl alcohol and an equimolar amount of p-toluenesulfonyl chloride are mixed and cooled to 0° C. Two molar equivalents of pyridine are slowly added over 3–4 hours at 0° C. An excess of dilute hydrochloric acid is added and the resulting mixture is extracted with ether. The ethereal solution is dried and then distilled to give p-butoxybenzyl p-toluenesulfonate.

Reacting p-butoxybenzyl p-toluenesulfonate in ethanol with thiourea and treating the resulting thiuronium p-toluene-sulfonate salt in aqueous acetic acid with chlorine gas gives p-butoxy-α-toluenesulfonyl chloride. This sulfonyl chloride in ether is reacted with diethylamine according to the procedure of Example 4 to give p-butoxy-N,N-diethyl-α-toluenesulfonamide.

Using p-butoxy-N,N-diethyl-α-toluene sulfonamide in place of N,N-dimethyl-α-toluenesulfonamide in the procedure of Example 2 gives ethyl α-(p-butoxyphenyl)-α-(diethylsulfamoyl)butanoate.

By the same procedure, using m-butoxybenzyl alcohol, the product is ethyl α-(m-butoxyphenyl)-α-(diethylsulfamoyl)butanoate.

EXAMPLE 8

In the procedure of Example 1 using the following in place of dimethyl carbonate:

dipropyl carbonate
butyl chloroformate the following products are obtained, respectively:

propyl α-(dimethylsulfamoyl)-α-phenylbutanoate
butyl α-(dimethylsulfamoyl)-α-phenylbutanoate.

EXAMPLE 9

α-Toluenesulfonyl chloride (19.0 g.) is dissolved in 100 ml. of ether. The ether solution is added with stirring to 25 g. of dipropylamine in 500 ml. of ether. After stirring for 18 hours, then filtering, concentrating the filtrate and recrystallizing the residue from isopropyl ether, N,N-dipropyl-α-toluenesulfonamide is obtained.

Using N,N-dipropyl-α-toluenesulfonamide in place of N,N-dimethyl-α-toluenesulfonamide in the procedure of Example 2, the product is ethyl α-(dipropylsulfamoyl)-α-phenylbutanoate.

By the same procedure using dibutylamine in place of dipropylamine, the product is ethyl α-(dibutylsulfamoyl)-α-phenylbutanoate.

EXAMPLE 10

Methyl α-(dimethylsulfamoyl)-α-phenylacetate, prepared as in Example 1, is treated with potassium hydride according to the procedure of Example 1 and the resulting anion in tetrahydrofuran is treated with an equimolar amount of methyl iodide in tetrahydrofuran. The mixture is stirred at room temperature for 1.5 hours, then heated at reflux on a steam bath for 10 hours. Working up as in Example 1 gives methyl α-(dimethylsulfamoyl)-α-phenyl-propanoate.

EXAMPLE 11

Ethyl α-(dimethylsulfamoyl)-α-phenylacetate, prepared as in Example 2, is treated with potassium hydride in tetrahydrofuran by the procedure of Example 2. The resulting anion in tetrahydrofuran is reacted with an equimolar amount of propyl iodide. The mixture is stirred at room temperature for 10 minutes, then heated at reflux for 16 hours. Working up as in Example 2 gives ethyl α-(dimethylsulfamoyl)-α-phenylpentanoate.

By the same procedure, using butyl iodide in place of propyl iodide, the product is ethyl α-(dimethylsulfamoyl)-α-phenylhexanoate.

What is claimed is:

1. A compound of the formula:

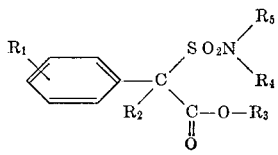

in which:

$R_1$ is hydrogen, chloro, bromo, fluoro, trifluoromethyl, lower alkyl or lower alkoxy and $R_2$, $R_3$, $R_4$ and $R_5$ are lower alkyl.

2. A compound according to claim 1 in which $R_1$ is hydrogen, $R_2$ is ethyl and $R_3$, $R_4$ and $R_5$ are methyl.

3. A compound according to claim 1 in which $R_1$ is hydrogen, $R_2$ and $R_3$ are ethyl and $R_4$ and $R_5$ are methyl.

References Cited

FOREIGN PATENTS 1,067,965    5/1967    England _____ 260—470

OTHER REFERENCES

Nicolaus et al., Helv. Chim. Acta. 45, 717 (1962).

JAMES A. PATTEN, Primary Examiner

J. F. TERAPANE, Assistant Examiner

U.S. Cl. X.R.

260—543 R, 556 AR, 564 R; 424—309